June 3, 1952     R. H. GODDARD     2,599,103
LIQUID FUEL FEEDING MEANS FOR
RESONANCE COMBUSTION CHAMBERS
Filed Oct. 17, 1946
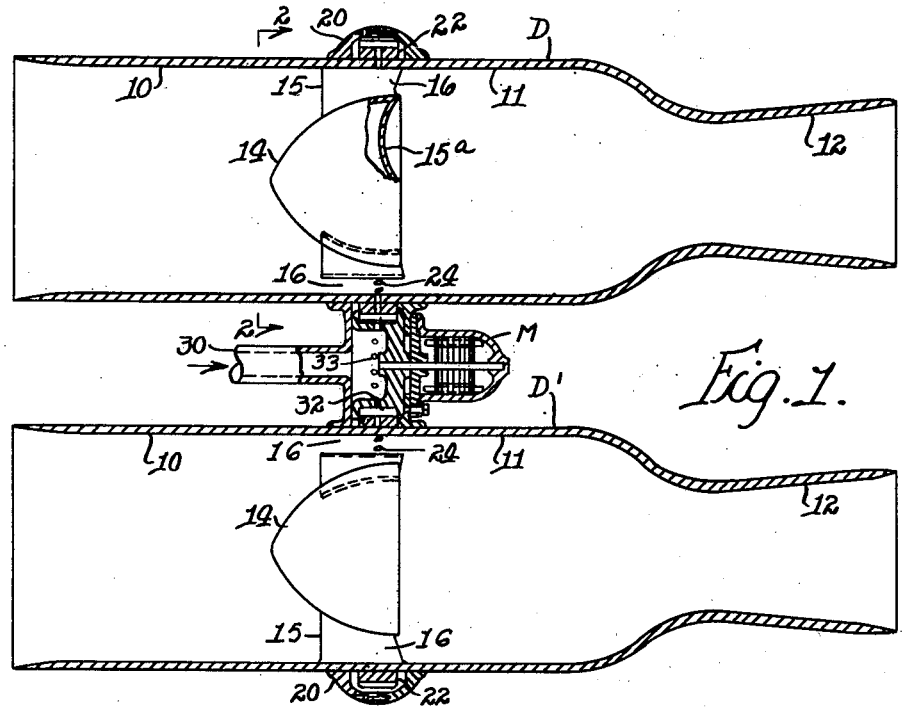
Fig. 1.
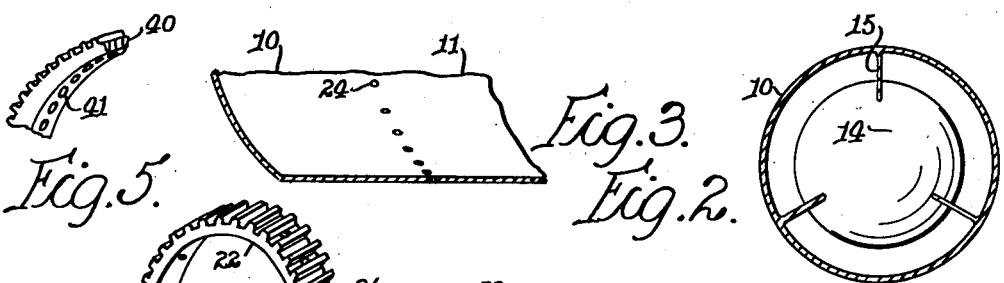
Fig. 5.    Fig. 3.    Fig. 2.
Fig. 4.    Fig. 6.    Fig. 7.
Fig. 8.
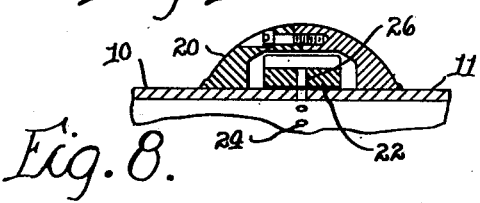
INVENTOR.
Robert H. Goddard, Dec'd.
Esther C. Goddard, Executrix
BY Chas. T. Hawley ATTY.

Patented June 3, 1952

2,599,103

UNITED STATES PATENT OFFICE 2,599,103

LIQUID FUEL FEEDING MEANS FOR RESONANCE COMBUSTION CHAMBERS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application October 17, 1946, Serial No. 703,882

2 Claims. (Cl. 60—35.6)

This invention relates to a combustion chamber operating on the resonance principle.

One object of the invention is to provide a resonance combustion chamber with improved feeding devices for producing an interrupted or pulsating fuel flow to the chamber.

Another object is to provide a construction by which a pair of such resonance combustion chambers may be fired alternately and in predetermined timed relation and also with very high frequency.

The invention further relates to arrangements and combinations of parts which will be hereinafter described and more particularly pointed out in the appended claims.

A preferred form of the invention is shown in the drawing, in which:

Fig. 1 is a sectional plan view of a pair of resonance chambers embodying the invention;

Fig. 2 is a sectional view of one of the chambers, taken along the line 2—2 in Fig. 1;

Fig. 3 is a fragmentary portion of a chamber wall;

Fig. 4 is a perspective view of a geared valve ring;

Fig. 5 is a fragmentary perspective view of a slightly modified valve ring construction;

Fig. 6 is a perspective view of a valve driving pinion;

Fig. 7 is a fragmentary end view, showing the engagement of the driving pinion with the valve rings; and Fig. 8 is an enlarged sectional elevation of a valve ring and associated parts.

Referring to Fig. 1, combustion apparatus is shown comprising two combustion devices D and D', each having an air-collecting portion 10, a combustion chamber 11, and a discharge nozzle 12. An air-directing member 14 is mounted in each combustion device between the air-collector 10 and the combustion chamber 11.

Each member 14 is supported by webs 15 (Fig. 2) in spaced relation to the combustion chamber wall and provides a relatively narrow annular passage 16 for the in-flow of the collected air to the combustion chamber 11.

The forward or left-hand surface of each air-directing member 14 is of generally conical shape but with an outwardly convex surface, which facilitates air flow past said member. The rear surface of each member 14 is recessed as indicated at 15a in Fig. 1 to provide a concave annular surface which facilitates the production of vortices in the combustion chamber 11, with correspondingly thorough intermingling of the air and the liquid or gaseous fuel.

An annular casing 20 surrounds each combustion chamber 11 and encloses a separate valve ring 22 for each combustion chamber 11. The chamber wall within the casing 20 has a plurality of uniformly spaced feed openings 24 (Fig. 3), and each valve ring 22 has an equal number of similarly spaced feed openings 26 (Fig. 4). The valve rings 22 rotate freely but with limited clearance about the combustion chambers 11, and the feed openings 26 are advanced progressively into and out of alignment with the openings 24. Liquid or gaseous fuel may be fed to the casings 20 through a joint axial feed pipe 30.

The two valve rings 22 are simultaneously rotated by a driving pinion 32 (Figs. 1, 6 and 7), the engagement of the pinion 32 and valve rings 22 being such that when the feed openings for one chamber are in alignment, the feed openings for the other chamber are out of alignment. The pinion 32 may be rotated by an axially positioned motor M, supported by the annular casings 20. Fuel from the pipe 30 may enter the casing 20 through ports 33 in the pinion 32.

As the valve rings 22 are thus rapidly rotated by the motor M through the driving pinion 32, the feed openings 26 and 24 will be alternately aligned and disaligned many times during each rotation of each valve ring, so that a pulsating fuel feed of very high frequency will be attained. The period of admission of fuel for each alignment of the feed openings may be prolonged by providing modified valve rings 40 (Fig. 5) having elongated feed openings 41 which will remain in communication with the fixed feed openings 24 for a longer period of angular advance movement of the ring valve.

The described apparatus is well adapted for its intended purposes and provides an efficient and economical method of producing combustion gases for rocket apparatus.

Having been thus described, the invention is not to be limited to the details herein disclosed, otherwise than as set forth in the claims, but what is claimed is:

1. In a resonance apparatus comprising a combustion unit having an air-collecting portion, a discharge nozzle aligned therewith and a combustion portion interposed between said air-collecting portion and said discharge nozzle and through which air flows in a continuous stream, and said combustion portion having a multiplicity of peripheral fuel ports disposed in an annular series in said portion, in combination, a single annular fuel valve rotatable about said combustion portion and having a multiplicity of fuel-admitting openings equal in number and spacing to said peripheral fuel ports, means to supply liquid fuel to the air in the continuous airstream through said multiplicity of fuel-admitting openings and peripheral ports, and a single independent power means effective to rotate said fuel valve and to thereby open and close all of said fuel-admitting openings and said peripheral fuel ports simultaneously and at predetermined high frequency.

2. The combination in resonance apparatus as set forth in claim 1, in which two combustion units are mounted in adjacent parallel relation and in which the single power means is mounted between said two units and rotates the two annular valves thereof simultaneously and at equal speeds, and in which said annular valves are held in such angular relation by said interposed power means that the ports in one combustion unit are opened when the ports in the other combustion unit are closed.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 1,006,088 | Hippisley | Oct. 17, 1911 |
| 1,132,708 | Edwards | Mar. 23, 1915 |
| 1,369,672 | Koenig | Feb. 22, 1921 |
| 2,110,986 | Kadenacy | Mar. 15, 1938 |
| 2,427,845 | Forsyth | Sept. 23, 1947 |
| 2,480,540 | Bodine | Aug. 30, 1949 |
| 2,523,308 | Kemmer | Sept. 26, 1950 |

FOREIGN PATENTS

| Number | Country | Date |
|---|---|---|
| 345,486 | France | Oct. 17, 1904 |
| 365,042 | France | June 15, 1906 |